Patented Jan. 3, 1939

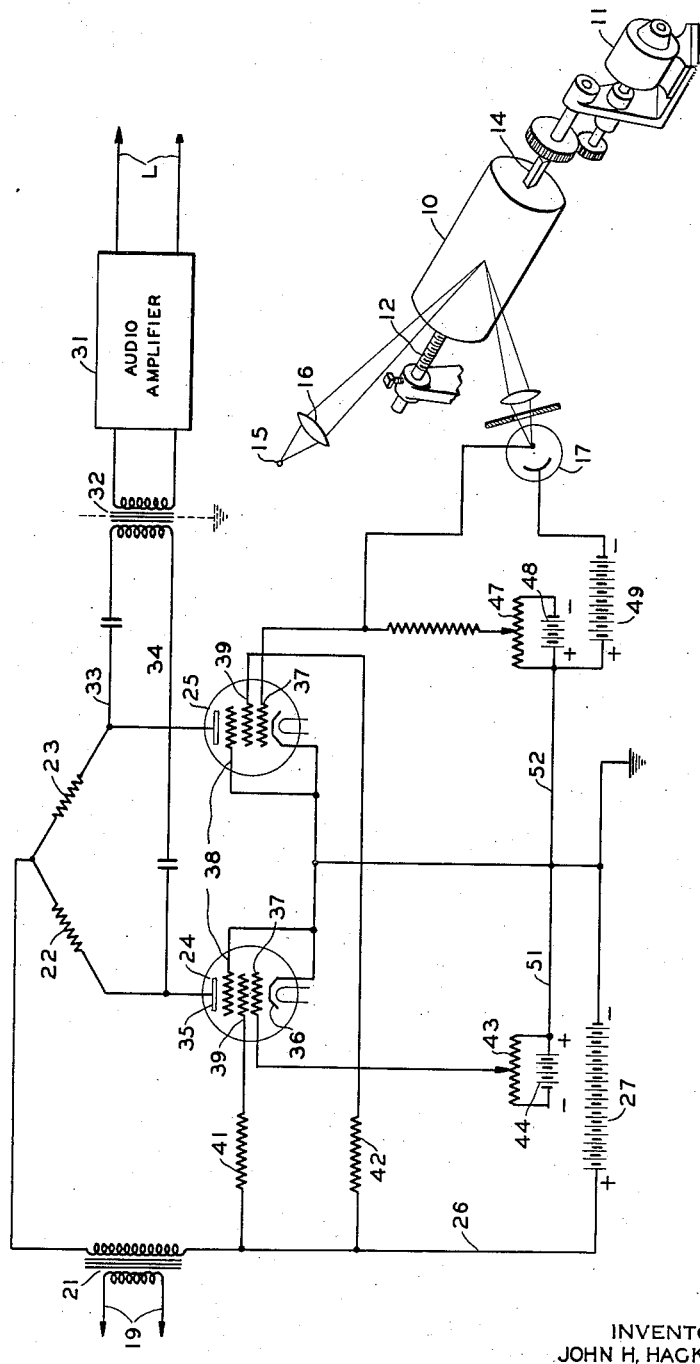

2,142,940

UNITED STATES PATENT OFFICE 2,142,940

SYSTEM FOR PRODUCING MODULATED CURRENTS

John H. Hackenberg, Beechhurst, N. Y., and Keith B. Eller, Metuchen, N. J., assignors to The Western Union Telegraph Company, New York, N. Y., a corporation of New York Application October 3, 1935, Serial No. 43,408

5 Claims. (Cl. 178—7.1)

The present invention relates to signal producing systems and more particularly to a novel system for producing a signal output which varies in accordance with the light and dark portions of a scanned field.

The primary object of the present invention is to provide an arrangement employing electrical discharge devices in a novel manner whereby the light values of successive elements of a scanned field acting on a photosensitive device serve to modulate a carrier current derived from a suitable source.

A further object of the present invention is to provide a combined modulator and amplifier utilizing the principle of the Wheatstone bridge, two arms of which comprise the anode and cathode impedance of vacuum tubes.

Another object of the present invention is to provide a novel modulator utilizing the principle of the Wheatstone bridge for use in the transmission of picture messages and the like wherein the amplitude of the carrier which is supplied to the modulator from a suitable source may be increased by means of a high ratio coupling transformer to almost any desirable value, thus increasing the sensitivity of the bridge and minimizing the necessity for subsequent amplification.

Still another object of the present invention is to provide a modulator of novel form utilizing the principle of the Wheatstone bridge and in which the bridge ratio arms and grid bias potentials on the tubes may be so chosen that the maximum efficiency of the vacuum tube as an amplifier may be obtained.

Still another object of the present invention is to provide a modulator of novel form utilizing the principle of the Wheatstone bridge in such a manner that the bridge may be balanced either on the white or black portions of a picture so that either a "positive" or a "negative" is transmitted.

Still another object of the present invention is to provide a novel modulator of carrier frequencies wherein the percentage modulation may be controlled from a small value up to full one hundred per cent modulation, thereby to provide a simple means of controlling the "contrast" of the transmitted picture.

A still further object of the present invention is to provide a modulator employing electron discharge devices which are operated on the straight portions of their characteristic curves.

A still further object of the present invention is to provide a novel means for biasing the shielding electrodes of electron discharge devices used in the arms of a Wheatsone bridge circuit.

These and other objects of the invention will appear from the following description of an illustrative embodiment of the present invention. The drawing illustrates diagrammatically a system embodying the present invention for producing picture modulated currents.

The system of the present invention is particularly adapted for use when a carrier current supplied from a suitable source is to be modulated in accordance with successive elements of a scanned field by directing light upon said scanned field and causing said light to be incident upon a photosensitive device. Referring to the drawing, the subject matter to be scanned may conveniently be mounted upon a drum 10 which is rotated through a suitable driving connection by a motor 11. As the drum rotates, it is advanced axially by means of its threaded engagement with a non-rotating threaded shaft 12. Rotational movement is imparted to the drum by the squared shaft 14 which engages a square opening in a disc or flange mounted within or at the end of drum 10. Light from a suitable source 15 is concentrated by the lens 16 upon the picture, message or other subject matter which is to be scanned and is reflected from the surface of the said subject matter into the photosensitive device 17, the latter being suitably supported in a housing or the like (not shown) at a proper distance from the outer periphery of the cylinder 10. The spot of light projected upon the surface of the cylinder 10 by the lens 16 is caused to traverse the cylinder in a longitudinal direction as the cylinder rotates by reason of the axial movement of the cylinder, the pitch of the thread on the shaft 12 determining the extent of movement of the cylinder during each rotation thereof. In this manner the spot of light will follow a spiral path as the peripheral surface of the cylinder 10 which bears the subject matter to be scanned is rotated, thus producing a scanning action.

The foregoing method of obtaining a scanning movement per se is well known, as are various other methods of scanning a given field, and it is to be understood that any of the known optical methods of scanning suitable for the purpose may be employed in lieu of the foregoing method described.

An alternating potential to be modulated in accordance with successive elements of the scanned field is obtained from a source 19 of alternating current and is continuously applied to the primary of the transformer 21. The frequency of the alternating current which is chosen may vary within wide limits depending upon the purpose for which the system is employed, the desired rate of scanning or speed of operation, the constants of the communication circuit L over which the subject matter is transmitted and other factors. The transformer 21 is preferably of the step-up type having a high ratio coupling whereby the amplitude of the carrier which appears in the secondary of the transformer is increased. The output of the transformer is impressed at two opposite terminals of a Wheatstone bridge, the four arms of the latter comprising the resistances 22 and 23 and the cathode to anode impedances of the thermionic tubes 24 and 25. This bridge acts as a modulator and an amplifier in a manner to be described. The transformer secondary is connected in a conductor 26 which also includes a source of anode potential 27. The conductor 26 is connected across two terminals of the Wheatstone bridge circuit.

The output of the bridge is impressed on the amplifier 31 by means of a coupling transformer 32. The amplifier 31 in turn is connected to the communication channel L over which the signals are to be transmitted to a remote facsimile receiver (not shown) of a suitable kind, such for example as that disclosed in application Serial No. 23,926 filed May 28, 1935, of Raleigh J. Wise. Two condensers are interposed in the conductors 33 and 34 which connect the coupling transformer 32 with two opposite terminals of the Wheatstone bridge circuit. They serve as blocking condensers to prevent shorting of the bridge.

The tube 24 includes an anode 35, a cathode 36 and a control grid 37 which elements are also present in the tube 25. The tubes 24 and 25 may be of the type provided with shielding electrodes 38 connected to the cathode and with additional shielding electrodes 39. These latter shielding electrodes 39 are connected to the conductor 26 which is joined to the positive pole of the source of potential 27 through like resistors 41 and 42. This manner of connecting the shielding electrodes 39 to the source of potential prevents short-circuiting of a portion of the space discharge path in each tube forming two arms of the bridge. The control grid 37 of the tube 24 is connected to the movable contact of a potentiometer 43 which comprises a source of biasing potential 44. The latter may conveniently be a battery as illustrated in the drawing. The control electrode 37 of the tube 25 is connected to the cathode of the tube 25 through a source of biasing potential provided by the potentiometer 47 which is supplied by a source of biasing voltage 48. The cathode of the photocell 17 previously mentioned is connected to the negative pole of a source of potential illustrated as the battery 49. The remaining electrode of the photocell 17 is connected to the control electrode 37 of the vacuum tube 25. The grid circuits of the vacuum tubes 25 and 26 are completed by the conductors 51 and 52 which are joined to the cathodes of the tubes and to the negative terminal of the source of potential 27.

The arrangement disclosed provides an effective means for varying the degree of modulation of the carrier current derived from the source 19 and also provides effective and readily controllable means for changing the degree of contrast in a picture or other representation reproduced from the output. A further important feature of the arrangement disclosed is that it may be operated in a manner to produce either a positive or a negative picture from the scanned field 10.

In operation of the system described, the initial bias on the control grids 37 of the tubes 24 and 25 is preferably selected so that the tubes are operated on the straight portion of their characteristic curves. In this manner a modulator is provided in which the output varies linearly in proportion to the grid swing.

By control of the grid bias of tube 24 as by adjusting the potentiometer 43, the bridge may be balanced either on a white or black part of a scanned field and in this manner either a positive or a negative may be transmitted at will. For example, where the picture or message within the scanned field of the drum 10 is made up of light and dark areas, if the bridge is balanced with the spot of light incident on the darkest portion of the field, the subject matter as reproduced at the receiver will show blank portions when the darkest portion of the subject matter to be transmitted is scanned. A negative representation will be reproduced at the receiver as a result. On the other hand, if a positive reproduction is desired, the bridge will be balanced with a spot of light incident on a blank or white portion of the scanned field.

The degree or percentage of modulation of the carrier derived from the source 19 may be controlled by adjusting the bias of the control grid 37 of the tube 24 by means of the potentiometer 43 in the following manner. If, for example, reproduced subject matter is desired having less contrast than the original, an adjustment may be made with the spot of light incident on a given portion of the scanned field such as the lightest portion thereof, and the potentiometer 43 may be adjusted so that any desired amount of the carrier current derived from the source 19 appears in the output of the bridge. In this condition of the circuit the bridge is unbalanced by an amount determined by the contrast desired. In this manner the light value of the background of the reproduced subject matter can be readily controlled.

While there is shown and described herein an illustrated embodiment of the invention, the invention may be embodied in other forms and therefore the invention is not limited except as indicated by the terms and scope of the appended claims.

We claim as our invention:

1. In a system for modulating an alternating current in accordance with light variations, a light sensitive device, a bridge circuit, an output circuit coupled to said bridge circuit, a pair of space discharge devices comprising two arms of said bridge circuit, a source of alternating current for impressing currents of carrier frequency across said bridge circuit, means responsive to light variations applied to said light sensitive device to change the impedance of one of said space discharge devices and means for independently varying the impedance of the other of said space discharge devices.

2. In a system for modulating an alternating current in accordance with light variations, a Wheatstone bridge, a source of carrier current for impressing a carrier current on said bridge, an output circuit associated with said bridge, an impedance in one arm of said bridge, a light sensitive device connected to vary the value of said impedance according to changes in light values incident thereon, and adjustable means in another arm of said Wheatstone bridge adapted at one adjustment thereof to cause the output in said output circuit to increase as the light value is decreased and at another adjustment thereof to cause the output in said output circuit to decrease as the light value is decreased.

3. In a modulator for modulating an alternating current in accordance with light variations, a source of alternating current, an output circuit, a light sensitive device and a pair of electron discharge devices comprising two arms of a Wheatstone bridge circuit, said bridge connected between said source and said output circuit, means to supply a fixed biasing potential to one of said electron discharge devices, and means to impose a biasing potential to the other of said electron discharge devices variable in accordance with changes in light values incident on said light sensitive device.

4. In a system for modulating an alternating current in accordance with light variations, a Wheatstone bridge comprising a source of carrier current, a thermionic tube comprising a cathode and anode connected in an arm of said bridge, a control electrode and a shielding electrode in said tube, means to apply a constant bias to said control electrode, a second thermionic tube comprising a cathode and anode connected in another arm of said bridge, a control electrode and a shielding electrode in said second named tube, a photo-cell connected to apply a bias to said last named control electrode in accordance with light variations incident upon said photo-cell, a common source of anode current for said tubes, separate resistances each having approximately the same value, said shielding electrodes of each tube connected to said common source of anode current through one of said resistances.

5. In a system for producing amplified picture modulated currents, a source of carrier current, an output circuit, a Wheatstone bridge including thermionic tubes in two arms thereof, a control electrode in each of said tubes, means to vary the bias of the control electrode of one of said tubes in accordance with the light and shade of a scanned field, means to adjustably control the bias of one of said control electrodes of the other tube whereby to produce a balanced condition of said bridge circuit for a given light value of said scanned field and thereby control the contrast in a picture reproduced from said output.

JOHN H. HACKENBERG.
KEITH B. ELLER.